Nov. 26, 1940.  C. C. KING  2,222,816
GLASS MELTING TANK
Filed March 10, 1939    3 Sheets-Sheet 1

Inventor
C. C. King,
Prevost & Prevost
Attorneys

Nov. 26, 1940.　　　C. C. KING　　　2,222,816
GLASS MELTING TANK
Filed March 10, 1939　　　3 Sheets-Sheet 2
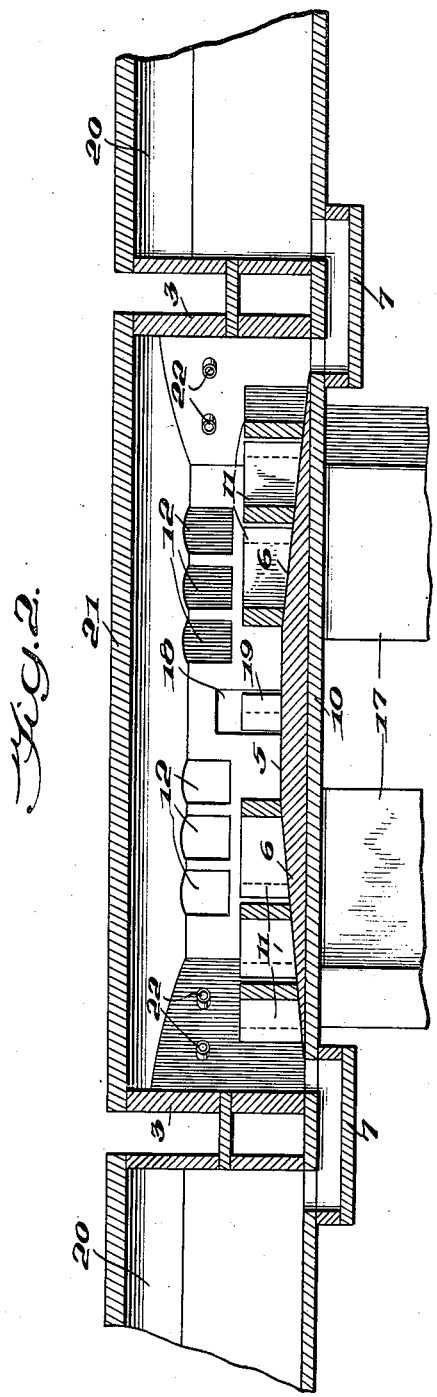
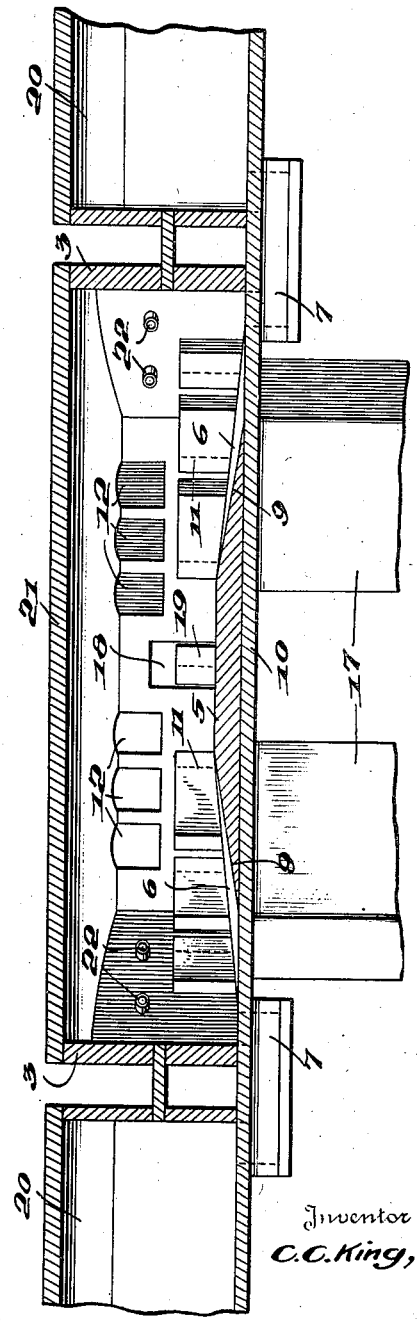
Inventor
C. C. King,
By Prevost & Prevost
Attorneys

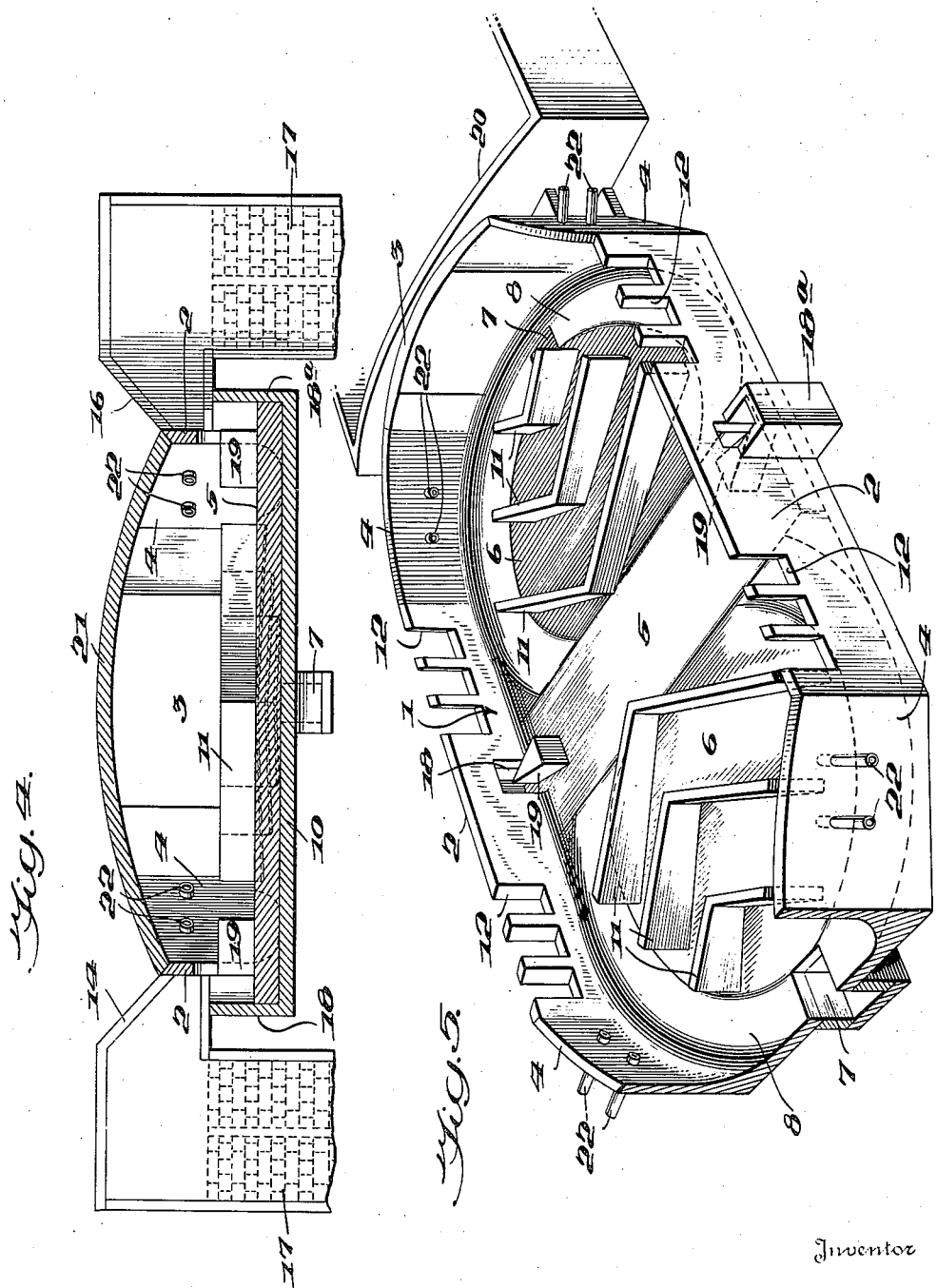

Patented Nov. 26, 1940

2,222,816

UNITED STATES PATENT OFFICE 2,222,816

GLASS MELTING TANK

Cecil Clifton King, Millville, N. J.

Application March 10, 1939, Serial No. 261,053

8 Claims. (Cl. 49—54)

My invention consists in new and useful improvements in glass melting furnaces of the type designed for supplying molten glass to a plurality of machines for manufacturing bottles and various articles of glassware.

The primary object of my invention is to provide a furnace of this general type which due to the shape of its side walls, the novel contour of the surface of the bottom of the melting pot and the angles of the batteries of burners, will eliminate still spots, cause a more efficient agitation or kneading action and facilitate the gravity flow of the refined glass to the receiving tanks.

Another object of the present invention is to construct the bottom of the melting pot with an elevated central platform directly beneath the point of flame contact, said platform gradually inclining downwardly toward a throat at each end of the furnace, the surfaces of the inclined portions being provided with upwardly directed wings or baffles to more effectively control and direct the flow of the refined glass.

A further object of my invention is to afford a maximum utilization of heat by concentrating the flame on the most shallow area of the body of glass, while at the same time increasing the heat period by so positioning the firing and exhaust ports as to prolong the path of travel of the products of combustion, whereby a greater quantity of the combustible products is consumed in the furnace.

A still further object and advantage of my improved furnace resides in the construction whereby the apparatus is fed with batch from either side and the provision of a nose at each end of the melting pot, thus enabling the furnace to accommodate twice as many machines as the usual single tank furnace.

Still another object of my invention is to provide a furnace of the regenerative type wherein the batch is fed from both sides of the furnace onto a raised platform which extends across substantially the central portion of the tank, there being provided a series of burners adapted to alternately direct the flame downwardly and diagonally across the central portion of said raised platform, whereby the glass undergoing treatment is more quickly and efficiently melted and caused to circulate in two oppositely travelling bodies.

A further object of my invention is to provide in a furnace of the type just referred to, means for directing the flow of the refined glass around the edges of the tank to thereby prolong the path of travel from the point of melting to the throats.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a top plan view of the furnace with the top removed.

Fig. 2 is a longitudinal section on line 2—2 of Fig. 1.

Fig. 3 is a longitudinal section on line 3—3 of Fig. 1.

Fig. 4 is a transverse section taken on line 4—4 of Fig. 1, and

Fig. 5 is a perspective view with one end of the furnace in section and the top removed.

Figure 1:
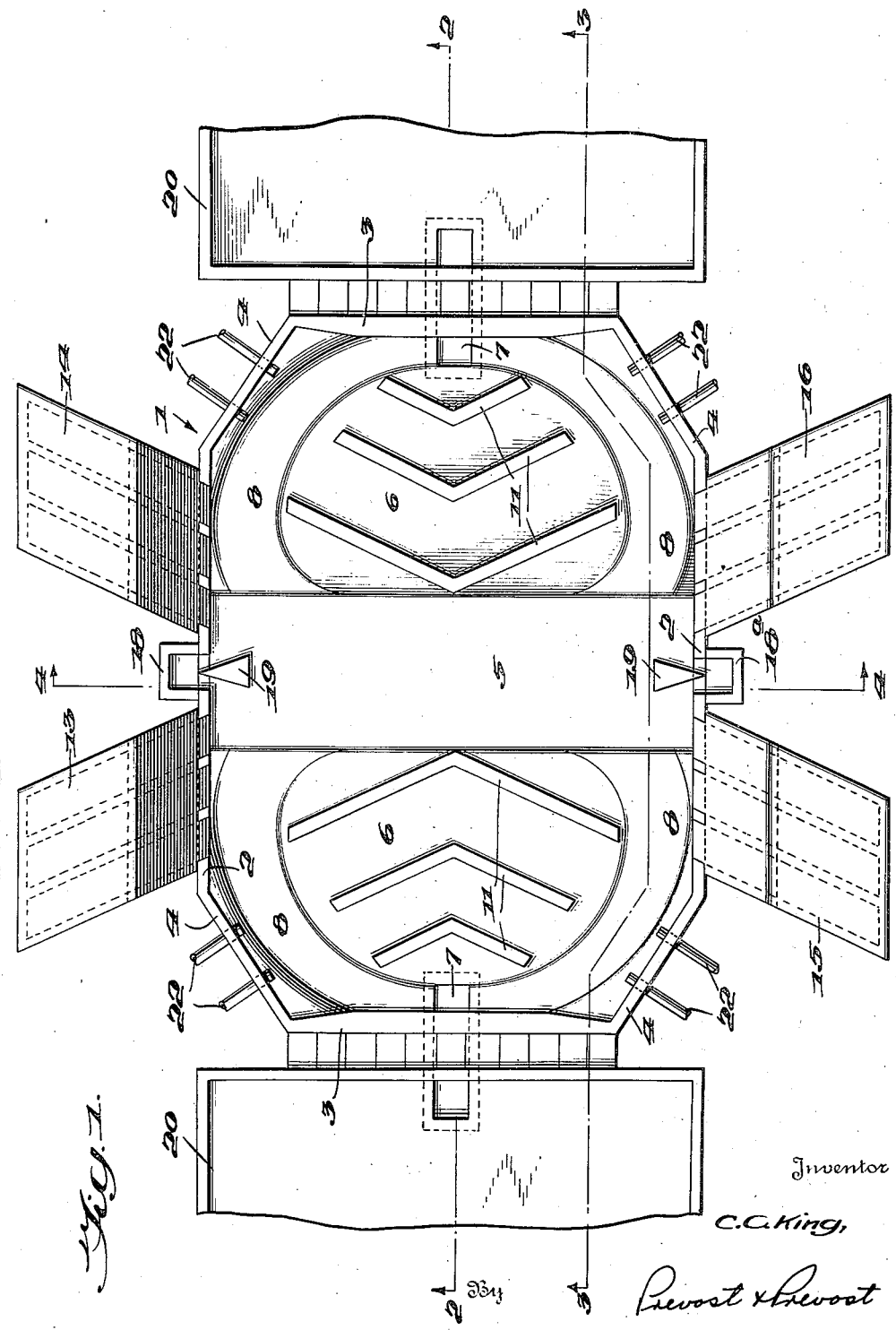

In the drawings 1 represents the melting pot proper of my improved furnace, having side walls 2 and end walls 3 constructed of any suitable refractory material. Instead of the usual rectangular tank however, I eliminate the corners by providing in place thereof four angularly disposed walls 4, thus forming a substantially octagonal melting pot as clearly shown in Fig. 1.

The bottom 10 of the melting pot is also composed of refractory material and is built up at its central portion so as to provide an elevated flat platform 5 which extends transversely across the furnace from one side wall to the other. Each of the opposite edges of the platform 5 merges into a downwardly inclined portion 6, the lowest extremity of which terminates adjacent the respective throat 7 at either end of the melting pot.

Around the edges of the inclined portions 6 the bottom is provided with substantially circular troughs or grooves 8 which bound said inclined portions on either side and terminate at the opening of the respective throat 7. As shown in Fig. 3 it is preferable to build up the surfaces of the troughs 8 immediately adjacent the platform 5 so as to provide gradual inclinations 9 which prevent a sudden drop of the molten glass from the platform 5. As before stated the walls and bottom are formed of refractory blocks, and in the construction of the troughs I preferably employ a bottom layer of wall blocks the exposed faces of which are curved inwardly to form the curved outer contour of the troughs 8. The built up portions of the bottom are also formed of blocks properly laid to provide the desired platform and inclined portions, and the edges of the inclined portions adjacent the troughs are formed by a layer of curved blocks similar to those heretofore referred to.

Each of the inclined portions 6 is equipped with a series of angular baffles or fins 11 which are preferably composed of any suitable material which will neither float nor burn. These baffles extend vertically to substantially the level of the molten glass in the melting pot and the angle of each series is disposed opposite to that of the other. As will be seen in Fig. 1 the side wings of the baffles of each series are longer near the center of the tank and gradually reduce in length toward the throats.

Each of the side walls 2 has two series of burner ports 12 adapted to accommodate respective batteries of burner heads 13, 14, 15 and 16 arranged at the upper ends of uptakes or checkerwork conduits 17. The burners 13 and 14 are arranged on one side of the furnace at angles which converge at the center of the platform 5 while burners 15 and 16 are arranged at similar angles on the opposite side of the furnace. In each instance the burner heads are so constructed as to direct the flame at a slight downward angle onto and diagonally across the top of the mass of molten glass over platform 5.

In glass furnaces of this general type it is customary to alternately reverse the operation of the burners, employing one burner on one side of the furnace for heating and one burner on the opposite side as an exhaust for carrying off the products of combustion, controlling the alternation by suitable dampers, not shown. In this way by alternately reversing this action the mass of molten glass is caused to whirl first in one direction and then another for the purpose of agitating and kneading the mass. Thus the arrangement shown in Fig. 1 places burners 13 and 16 diagonally opposite one another in direct alinement and the same is true of burners 14 and 15.

Each side wall 2 is provided with a conventional dog-house 18—18a arranged between respective converging burners, the feed openings of each dog-house being substantially in line with the center of the platform 5. Adjacent each of said openings the platform 5 carries an angular dividing block or spreading baffle 19 preferably composed of any suitable non-burning stone such as Corhart, the apex of said baffle lying adjacent the central portion of the said opening. Thus as the batch is fed through the dog-house it is spread out on top of the molten mass in the melting pot in the path of the flame from the active battery of burners.

At each end of the melting pot the throat 7 is in communication with a conventional receiving or gathering tank 20 adapted to accommodate a plurality of machines in the usual manner.

The melting pot is closed by a top or crown 21 supported on the walls of the furnace.

If desired the angular walls 4 may be provided with auxiliary burners 22 to burn either oil or gas, said burners being arranged at a point just above the level of the molten glass. Thus if for any reason the main burners should prove insufficient to properly condition the glass the auxiliary burners 22 may be brought into operation.

In this connection it will be noted from Fig. 1 that due to the octagonal shape of my improved tank, six sides are available for the accommodation of burners, each of said six sides facing substantially the center of the tank whereby the flame from any of the burners is directed toward the central portion of the tank where I desire to concentrate the heat.

Having thus described the construction of my improved melting furnace its operation is as follows:

Let us assume that the batch is being fed first through the dog-house 18 and the battery of burners 13 is the active battery. The dog-house 18a remains inactive and the dampers in the uptakes leading to burner batteries 14 and 15 are closed. The damper in the uptakes leading to the battery of burners 16 is adjusted for exhaust. The batch fed through the dog-house 18 is divided by baffle 19 and directed in two streams into the path of the flame coming from the burners 13 and on top of the elevated platform 5. Due to the fact that over the platform 5 the mass of molten glass is shallower, the batch fed in at this point will melt more quickly. It will be noted that as a result of this construction the line of travel is further from the dog-house where the batch first enters the tank, to the path of the fire coming from the active burners, than in the conventional furnaces. This enables the glass to be partly melted before actually reaching the flow of fire from the burners and, being in a more or less gummy state, less of the batch is blown away through the exhaust ports and wasted. In other words in addition to concentrating the heat, a considerable saving in the batch is effected.

The products of combustion from the burners 13 flow diagonally across the furnace and are exhausted through the battery 16 thus prolonging the path of travel of the fire and increasing the time for the consumption of combustible products over and above that of the conventional furnaces wherein the active and exhaust ports are directly opposite.

The action of the flame due to my improved arrangement of ports and the shape of the melting pot, causes two oppositely whirling bodies of molten glass to follow the walls of the melting pot which thoroughly agitates and kneads the mass.

Refined glass always settles to the bottom of the tank and for this reason I have constructed the bottom of my tank in the manner described with the inclined portions 6 and the circular troughs 8, so as to control the gravity flow of the refined glass to the throats 7, the purpose of the baffles 6 and the circular shape of the trough 8 being to prevent the glass from flowing directly from the center of the tank to the throat and to cause the refined glass to travel a longer distance from the melting point to the throat. With my arrangement the impure or not yet refined glass will float in an endless whirl on top of the refined glass as a result of the action of the diagonal ports, thereby being repeatedly subjected to the action of the flame.

As will be readily apparent to those skilled in the art, after operating the battery of burners 13 for a predetermined period which, in most instances, is approximately one-half hour, burners 14, 16 and 15 are successively brought into operation as firing batteries with the respective diagonally opposite burners used for exhausting the products of combustion.

It will be noted that the feed of batch is also reversed from one dog-house to the other whenever the firing battery is transferred from one side of the furnace to the other.

It will thus be seen that with the furnace herein described, I am able to double the capacity of a conventional tank of a comparable size by concentrating the heat at the center of the tank over the most shallow portion of the body of molten glass and prolonging the path of travel of the refined glass from the melting point to the respective throats. Furthermore, due to the arrangement whereby the molten mass is caused to circulate in two oppositely whirling bodies, the unrefined glass which floats on top of the refined glass is continuously and repeatedly brought into the path of heat concentration.

While I have shown and described a double nose melting tank with a centrally disposed elevated platform, it is to be understood that I do not intend to confine myself to this particular embodiment of my invention. In this connection, it will be noted that the fundamental principle of the present invention may be carried out in a conventional rectangular single nose melting tank feeding from the end opposite the nose, by constructing the elevated platform adjacent the feeding end of the tank and sloping the bottom from this platform to the throat at the nose end. In this event, it will of course be necessary to arrange the burners to properly direct the flame onto the molten glass over the raised platform, either directly across the tank or diagonally across as shown in the preferred form of my invention. In other words, the flame should be directed onto and across the most shallow portion of the body of molten glass.

In any embodiment, the features of primary importance are the construction of the elevated platform where the batch is quickly melted, the slope of the bottom from this platform to the nose, the arrangement of troughs around the edges of the sloping portion to direct the flow of refined glass from the melting point to the throat, and the baffles on the inclined portion for deflecting the molten glass toward the troughs.

From the foregoing it is believed that the construction and advantages of my improved glass melting tank may be readily understood by those skilled in the art without further description, it being borne in mind that numerous changes may be made in the details disclosed without departing from the spirit of my invention as set out in the following claims.

What I claim and desire to secure by Letters Patent is:

1. A glass melting tank comprising a substantially centrally disposed raised platform which extends transversely across the tank, means for feeding batch onto said raised platform, heating means for directing a flame downwardly and diagonally across substantially the central portion of said platform, means for exhausting products of combustion, the opposite edges of said platform merging into downwardly inclined longitudinally extending portions which terminate with their lowest extremities adjacent the longitudinal ends of the tank, a receiving tank for refined glass at each end of said tank, throats connecting said melting tank with said receiving tanks, and troughs extending from the edges of said platform to said respective throats on either side of said inclined portions.

2. A glass melting tank comprising a substantially centrally disposed raised platform which extends transversely across the tank, oppositely disposed means for feeding batch at each end of said platform, means adjacent said feeding means for spreading the batch onto said platform, heating means for directing a flame downwardly and diagonally across substantially the central portion of said platform, means for exhausting products of combustion, the opposite edges of said platform merging into downwardly inclined portions which terminate with their lowest extremities adjacent the longitudinal ends of the tank, a receiving tank for refined glass at each end of said tank, throats connecting said melting tank with said receiving tanks, and troughs extending from the edges of said platform to said respective throats on either side of said inclined portions.

3. A glass melting tank comprising a substantially centrally disposed raised platform which extends transversely across the tank, oppositely disposed means for feeding batch at each end of said platform, means adjacent said feeding means for spreading the batch onto said platform, heating means for directing a flame downwardly and diagonally across substantially the central portion of said platform, means for exhausting products of combustion, the opposite edges of said platform merging into downwardly inclined portions which terminate with their lowest extremities adjacent the longitudinal ends of the tank, a receiving tank for refined glass at each end of said melting tank, throats connecting said melting tank with said receiving tanks, troughs extending from the edges of said platform to said respective throats on either side of said inclined portions, and means on said inclined portions for deflecting the refined glass into said troughs.

4. A glass melting tank shaped to provide an inner surface which is devoid of abrupt angles within the level of the molten mass, a raised platform extending transversely across substantially the central portion of said tank, means for feeding batch onto said platform, the opposite edges of said platform merging into downwardly inclined portions which terminate with their lowest extremities adjacent the longitudinal ends of said tank, receiving tanks at either end of said melting tank, throats connecting said tanks, troughs extending from the edges of said platform to said throats, means on said inclined portions for deflecting refined glass into said troughs, and alternately reversible burners arranged to direct a flame downwardly and diagonally across substantially the central portion of said platform and for exhausting the products of combustion, whereby the glass undergoing refinement in each portion of said tank is caused to whirl in opposite directions.

5. In a glass melting tank having batch feeding means, heating means for directing a flame diagonally across said tank, and a delivery throat adjacent one end of the melting tank, means for prolonging the distance of travel of the refined glass from its melting point to said throat, comprising angular baffles on the bottom of said melting tank disposed in the normal line of flow of said refined glass, adapted to deflect the latter toward the edges of said tank, said baffles being arranged out of the path of said heating means.

6. In a glass melting tank having batch feeding means, heating means for directing a flame downwardly and diagonally across said melting tank, and a delivery throat adjacent one end of the melting tank, means for prolonging the distance of travel of the refined glass from its melting point to said throat, comprising a series of angular wings on the bottom of said melting tank disposed in the normal line of flow of said refined glass and extending substantially to the upper level of the molten glass in said melting tank, to deflect the molten glass toward the edges of said tank, said baffles being arranged out of the path of said heating means.

7. In a glass melting tank having a delivery throat at one of its longitudinal extremities, a bottom having a transversely extending elevated platform which merges into a downwardly inclined longitudinally extending portion, terminating with its lowest extremity adjacent said throat, troughs extending from the edge of said platform to said throat on either side of said inclined portion, a burner arranged to direct its flame diagonally over substantially the central portion of said raised platform, means for exhausting the products of combustion, and feeding means for depositing batch on to said platform.

8. In a glass melting tank having a delivery throat at one of its longitudinal extremities, a bottom having a transversely extending elevated platform which merges into a downwardly inclined longitudinally extending portion, terminating with its lowest extremity adjacent said throat, troughs extending from the edge of said platform to said throat on either side of said inclined portion, a burner arranged to direct its flame diagonally over substantially the central portion of said raised platform, means for exhausting the products of combustion, feeding means for depositing batch on to said platform, and means on the surface of said inclined portion for deflecting refined glass to said troughs.

CECIL CLIFTON KING.